US000001980H

(19) United States

(12) Statutory Invention Registration (10) Reg. No.: US H1980 H

Cloutier (43) Published: Aug. 7, 2001

(54) ADAPTIVE MATCHED AUGMENTED PROPORTIONAL NAVIGATION

(75) Inventor: James R. Cloutier, Niceville, FL (US)

(73) Assignee: The United States of America as represented by the Secretary of the Air Force, Washington, DC (US)

(21) Appl. No.: 08/753,754

(22) Filed: Nov. 29, 1996

(51) Int. Cl.[7] ..... F41G 7/00

(52) U.S. Cl. ..... 342/62; 701/302; 244/3.1; 244/3.15

(58) Field of Search ..... 244/3.1, 3.15; 342/62; 701/302

(56) References Cited

U.S. PATENT DOCUMENTS

| | | | |
|---|---|---|---|
| 4,162,775 | 7/1979 | Voles | 244/3.17 |
| 4,402,250 | 9/1983 | Baasch | 89/41 AA |
| 4,568,823 | 2/1986 | Diehl et al. | 235/404 |
| 4,719,584 | 1/1988 | Rue et al. | 364/516 |
| 4,760,397 | 7/1988 | Piccolruaz | 342/75 |
| 4,825,055 | 4/1989 | Pollock | 235/411 |
| 4,959,800 | 9/1990 | Woolley | 364/516 |
| 4,980,690 | 12/1990 | Fiden | 342/62 |
| 4,993,662 | 2/1991 | Barnes et al. | 244/3.17 |
| 5,035,375 | 7/1991 | Friedenthal et al. | 244/3.12 |
| 5,062,056 | 10/1991 | Lo et al. | 364/516 |
| 5,168,277 | 12/1992 | Lapinta et al. | 342/77 |

OTHER PUBLICATIONS

James R. Cloutier, Adaptive Matched Augmented Proportional Navigation AIAA Missile Sciences Conference, Monterey, CA, Nov. 1994, PP1–6.

Interim Report (Dec. 1993), Advanced Medium Range Air–To–Air Missile (AMRAAM) System Program Office "Bank–To–Turn In–House Control Study," Adaptive Matched Augmented Proportional Navigation, PP 70–74.

*Primary Examiner*—Daniel T. Pihulic

(74) *Attorney, Agent, or Firm*—Thomas L. Kundert; Bernard E. Franz

(57) ABSTRACT

Two new adaptive homing guidance laws are developed which are variants of Augmented Proportional Navigation (PRONAV). The first guidance law commands flight path angle rate and is referred to as adaptive matched augmented PRONAV (AMAAP). The second guidance law commands linear acceleration and is referred to as adaptive matched augmented linear PRONAV (AMALP). The major attributes of these guidance laws are (1) they are the solutions of a linear quadratic control problem, (2) they do not require an estimate of time-to-go ($t_{go}$), (3) they are matched to a nonlinear model of the target's motion, (4) they adapt in real time to provide optimal guidance over each small segment of the intercept trajectory, and (5) they optimally account for missile deceleration.

3 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

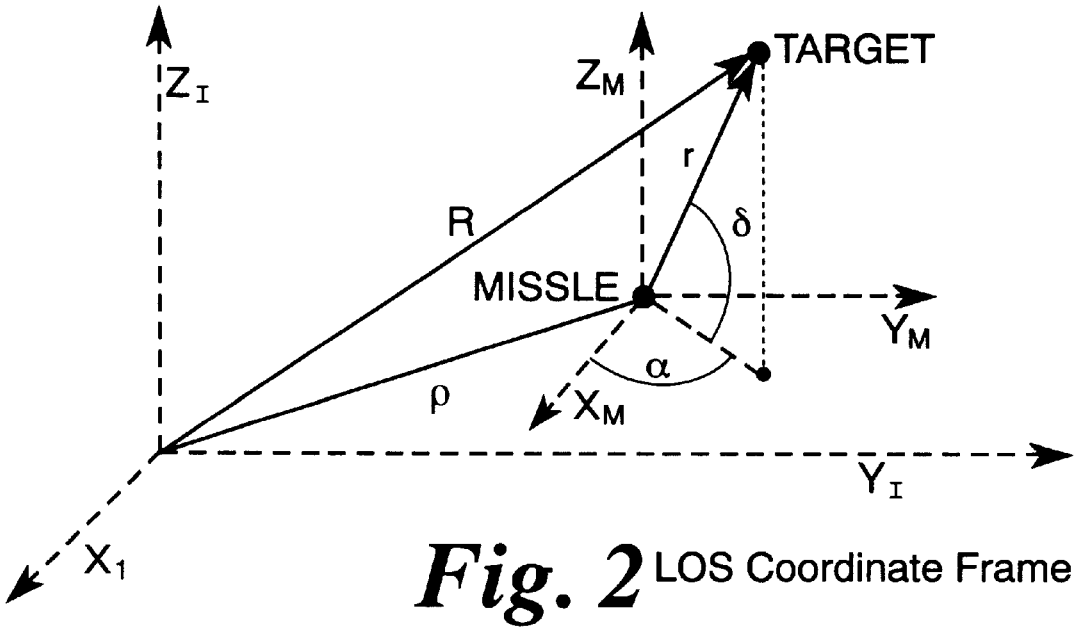
*Fig. 2* LOS Coordinate Frame

ADAPTIVE MATCHED AUGMENTED PROPORTIONAL NAVIGATION

RIGHTS OF THE GOVERNMENT

The invention described herein may be manufactured and used by or for the Government of the United States for all governmental purposes without the payment of any royalty.

BACKGROUND OF THE INVENTION

The present invention relates generally to missile guidance.

The traditional approach to missile guidance is to use Proportional Navigation (PRONAV). PRONAV was developed by C. Yuan at RCA Laboratories during World War II using physical intuition [1]. The resulting simplistic guidance law states that the commanded linear acceleration $a_c$ is proportional to the line-of-sight (LOS) rate $\dot{\sigma}_T$. The proportionality constant can be broken down into the product of the effective navigation ratio N times the relative missile-target closing velocity Vc, $$a_c = NV_c\dot{\sigma}_T \tag{1}$$

Two decades later, the quasi-optimality of PRONAV was derived [2]. The prefix quasi is used here because of all the assumptions that must be made in deriving PRONAV as a solution of a linear-quadratic optimal control problem [3]. These assumptions are as follows:

1. The target has zero acceleration.
2. The missile has perfect response and complete control of its acceleration vector.
3. The missile is launched on a near collision course such that the line-of-sight (LOS) angles remain small over the entire engagement.
4. The missile has zero acceleration along the LOS over all time.

In order to remove the first assumption, an additional term is added to the basic PRONAV equation in an attempt to account for target acceleration. The additional term is simply the target's estimated linear acceleration $a_T$ multiplied by a proportionality gain g3. In order to remove the fourth assumption, another term is sometimes included which attempts to compensate for missile slowdown $a_M$. The resulting guidance law, known as augmented PRONAV, is given in its most general form as $$a_c = NV_c\dot{\sigma}g3(t_{go})a_T + g_4(t_{go})a_M \tag{2}$$

where $g_3$ and $g_4$ are functions of $t_{go}$, which is the time remaining or time-to-go until impact or detonation. Using Assumption 3, an alternative form $$a_c = g1(t_{go})y + g2(t_{go})\,\dot{y} + g3[t_{go}]a_T + g4(t_{go})a_M \tag{3}$$

can be derived, where y is relative position and $\dot{y}$ is relative velocity, with $g1 = N/t_{go}^2$ and $g2 = N/t_{go}$.

Over the past twenty-five years, numerous linear-quadratic (LQ) optimal control problems have been posed attempting to improve upon augmented PRONAV and determine "optimal" values for the gains g1,g2,g3 and g4 (See ref. [4], Chapter 8). These LQ formulations have all been based on Cartesian-based target motion models and the resulting guidance law solutions all require knowledge of time-to-go.

There are two disadvantages associated with this type of guidance law development. The first disadvantage is that states in a Cartesian-based target motion are nonlinearly related to the seeker measurements which are spherical-based quantities, such as range, range rate, and azimuth and elevation angles. Thus, there is a certain amount of incompatibility between the seeker measurements and the target motion model. The second disadvantage is the requirement to estimate $t_{go}$. A consistently accurate estimate of $t_{go}$ cannot be obtained in a maneuvering target scenario since it depends upon the target's future motion, which is unknown.

In order to make the target state estimator more compatible with the seeker measurements and overcome the first disadvantage, a spherical-based target motion model was developed in reference [5]. Unfortunately, this model has nonlinear kinematics and if these kinematics were directly used in a posed optimal guidance law problem, the nonlinear control problem would have to be solved numerically in an iterative fashion. Furthermore, such a solution could not be obtained in real time on a missile-sized microprocessor.

In my co-pending application Ser. No. 08/233,588, filed Apr. 26, 1994, $t_{go}$ was eliminated in the development of guidance laws known as proportional guidance (PROGUIDE) and augmented proportional guidance (Augmented PPROGUIDE). However these guidance laws are not based on a nonlinear model of the target's motion and do not command flight path angle rate or linear acceleration. Instead they are based on a simple linear model of the target's motion and command flight path angle acceleration.

The following United States patents are of interest.

U.S. Pat. No. 5,168,277—LaPinta et al
U.S. Pat. No. 5,062,056—Lo et al
U.S. Pat. No. 5,035,375—Friedenthal et al
U.S. Pat. No. 4,993,662—Barnes et al
U.S. Pat. No. 4,980,662—Eiden
U.S. Pat. No. 4,959,800—Woolley
U.S. Pat. No. 4,825,055—Pollock
U.S. Pat. No. 4,719,584—Rue et al
U.S. Pat. No. 4,568,823—Dielh et al
U.S. Pat. No. 4,402,250—Baasch
U.S. Pat. No. 4,162,775—Voles None of the cited patents disclose Adaptive Matched Augmented Proportional Navigation which are based on two guidance law algorithms. The patent to Pollock discloses the use of a trajectory correction algorithm for object tracking. The remaining patents describe a variety of different tracking methods which are of less interest.

The following prior publications are of interest.

Yuan, C. L., "Homing and Navigation Courses of Automatic Target-Seeking Devices," Journal of Applied Physics, Vol. 19, Dec. 1948, pp. 1122–1128.

Fossier, M. W., "The Development of Radar Homing Missiles," Journal of Guidance, Control, and Dynamics, Vol. 7, Nov–Dec 1984, pp. 641–651, Zarchan, P., *Tactical and Strategic Missile Guidance*, Volume 124, Progress in Astronautics and Aeronautics, Published by the American Institute of Aeronautics and Astronautics, Inc., Washington D.C.

The following prior publications of interest are referenced in the specification by the indicated reference number.

[1] Yuan, C. L., "Homing and Navigation Courses of Automatic Target-Seeking Devices," RCA Labs, Princeton, N.J., Report PTR-12C, Dec 1942.

[2] Bryson, A.E. and Ho, Y.C., *Applied Optimal Control*, Blaisdell Publishing Company, Waltham, Mass. 1969.

[3] Riggs, T. L. and Vergez, P. L., "Advanced Air-to-Air Missile Guidance Using Optimal Control and Estimation," USAF Armament Laboratory, AFATL-TR-81-52, June 1981.

[4] Lin, C.F., *Modern Navigation, Guidance, and Control Processing*, Prentice Hall, Englewood Cliffs, N.J., 1991.

[5] D'Souza, C.N., McClure, M.A., and Cloutier, J.R., "Spherical Target State estimators," Proceedings of the American Control Conference, Baltimore, Md., June 1944.

[6] Proportional Guidance (PROGUIDE), and Augmented Proportional Guidance (AUGMENTED PROGUIDE) (See my said co-pending application Ser. No. 08/233,588, filed Apr. 26, 1994.

[7] Anderson, B.D.O. and Moore, J.B., *Optimal Control*, Prentice Hall, Englewood Cliffs, N.J., 1990.

[8] D'Souza, C.N., McClure, M.A., and Cloutier, J.R., "Bank-to-Turn In-House Control Study (BANCS)," Final report t the AMRAAM JSPO, June 1944.

[9] McClure, M.A. and D'Souza, C.N., "Integrated Guidance and Estimation Methodology Bank-to-Turn AMRAAM," (Restricted) Proceedings of the AIAA Missile Sciences Conference, Monterey, Calif., November 1944.

SUMMARY OF THE INVENTION

An objective of the invention is to increase the single-shot kill probability of tactical guided weapons via a revolutionary guidance technique.

Two optimal guidance laws have been developed which are based on the nonlinear spherical-based target motion model (ref. [5]) and which do not require an estimate of $t_{go}$. The problem of solving a nonlinear optimization problem in real time is avoided by creating a family of linear models where each member closely approximates the nonlinear kinematics model over a specific small portion of the trajectory. A family of linear-quadratic optimal control problems is then posed whose solution represents a family of guidance laws. Each member of this guidance law family represents an optimal guidance strategy over the corresponding small segment of the trajectory. In this way, the guidance laws are matched to the nonlinear kinematics model (ref. [5]) and the appropriate guidance law for each portion of the trajectory is then adaptively selected based on the estimates from the target state filter. The guidance concept is referred to as adaptive matched augmented PROVAV and the two (families of) guidance laws are referred to as adaptive matched augmented angular PRONAV (AMAAP) and adaptive matched augmented linear PRONAV (AMALP). In contrast to traditional PRONAV, which attempts to minimize miss distance, these guidance laws minimize deviations from the establishment of a collision course over the entire homing flight of the guided weapon. By using this strategy, AMAAP and AMALP indirectly minimize miss distance and do not require an estimate of $t_{go}$.

Adaptive Matched Augmented PRONAV may be implemented to command flight path angle rate via AMAAP, or linear acceleration via AMALP.

The new features of the AMAAP and AMALP guidance laws are that the algorithms (1) do not require an estimate of time-to-go $t_{go}$, (2) are matched to a nonlinear model of the target's motion over associated small segments of the intercept trajectory, (3) adapt in real time to produce optimal guidance over each of those small trajectory segments, and (4) optimally account for missile slowdown. The first feature provides a significant advantage over traditional PRONAV. This is due to the fact that a consistently accurate estimate of $t_{go}$ cannot be obtained, since it depends on future unknown target motion. The second and third features reveal that the new guidance laws are a priori theoretically tuned to the target state estimator. This results in a significant level of system integration between the target state estimator and the guidance laws. The importance of this is that it is now possible to greatly reduce, and perhaps even totally eliminate, the ad hoc tuning that traditionally must be done in Monte Carlo 6-dof (six degrees of freedom) simulation. Finally, the last feature eliminates the need for ad hoc approximations that attempt to account for missile deceleration.

BRIEF DESCRIPTION OF THE DRAWING

FIG. 2 is a diagram showing a LOS Coordinate Frame.

DETAILED DESCRIPTION

Figure 1:
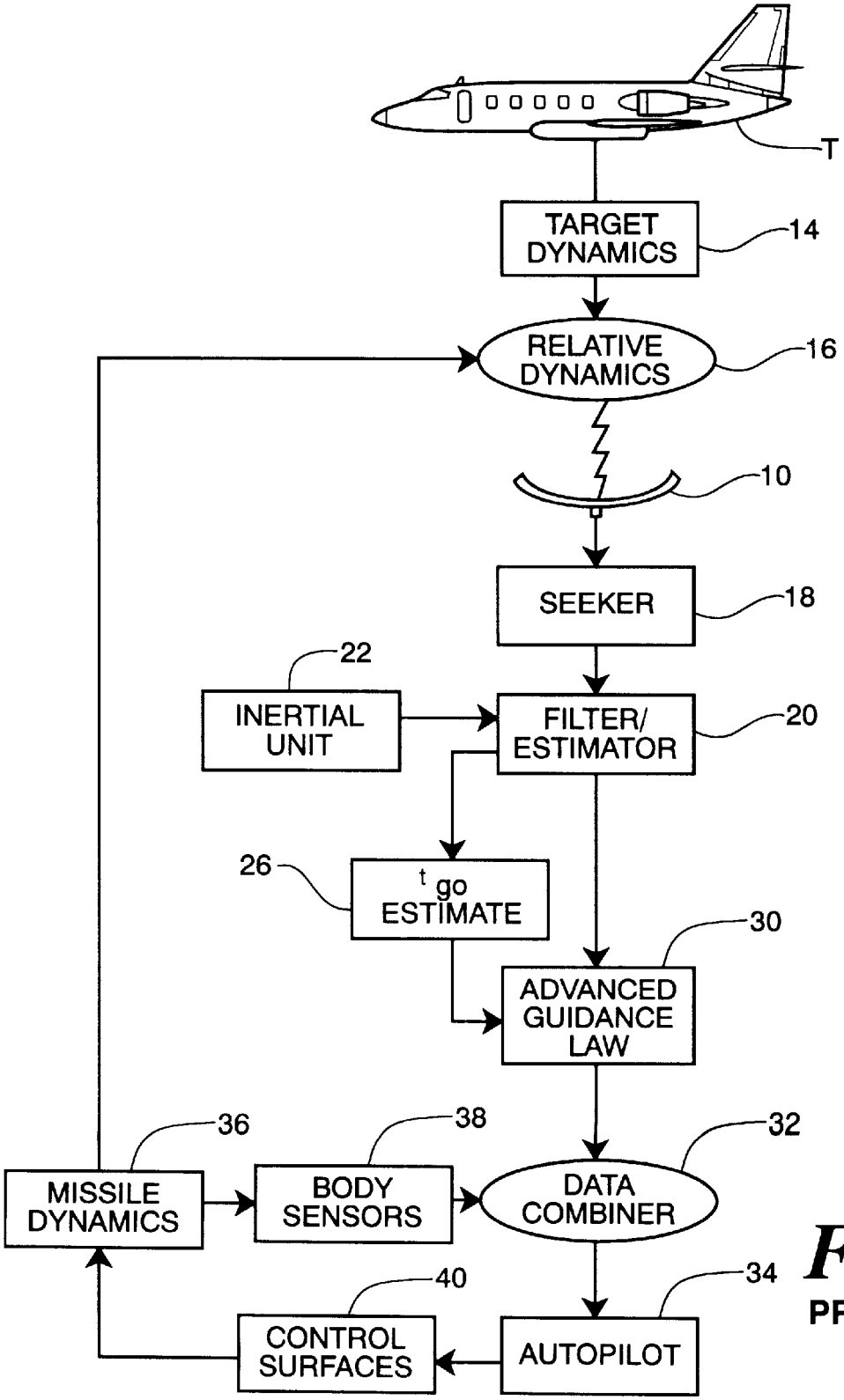
Fig. 1 PRIOR ART
FIG. 1 is a typical air-to-air missile block diagram.

The invention is disclosed in a WL/MN Interim Report dated Dec 1993, to the advanced medium range air-to-air missile (AMRAAM) System Program Office, entitled "Bank-To-Turn In-House Control Study", with limited distribution authorized for Dec. 17, 1993, and in a paper entitled "Adaptive Matched Augmented Proportional Navigation" which is in the restricted Proceedings of the AIAA Missile Sciences Conference, Monterey, Calif., Nov 1994. Copies of the report and paper are included herewith as part of the application as filed, and are hereby incorporated by reference.

Perhaps the most challenging of all guidance and control problems is that of a modern tactical air-to-air missile in pursuit of a highly maneuverable aircraft. The problem consists of the estimation of target motion, the generation of guidance commands to optimally steer the missile toward target intercept, and the control of the coupled, nonlinear, multivariable, uncertain dynamics of the air-to-air missile. Each portion of the problem, i.e., estimation, guidance, and control, is inherently nonlinear and time varying, and all three combine to form a highly complex integrated system. Block Diagram of Typical Guided Missile System (See FIG. 1)

A simplified block diagram of an advanced air-to-air missile system is given in FIG. 1. The units 10–40 are included in a guided missile which is in pursuit of a target aircraft T. The missile uses a seeker 18 (which includes an active radar unit having transmitter and receiver circuits) coupled to an antenna 10 to track the target T. The seeker 18 senses the relative dynamics between the target and the missile, as represented by blocks 14, 36 and 16.

Target information obtained from the seeker 18 is processed by a modern estimation filter 20, such as an extended Kalman filter, to obtain estimates of relative missile-to-target position, velocity, and acceleration. These filtered estimates are heavily dependent on an assumed target acceleration model. Input to the filter/estimator 20 is also provided from a inertial navigation unit 22, which processes data obtained from gyroscopes and accelerometers. A guidance law based on modern control theory uses the state estimates and an estimate of time to go until intercept to produce a commanded acceleration. The guidance law is implemented using a microprocessor in unit 30, with input from the filter/estimator 20, and the time-to-go estimator 26. Data from the guidance law unit 30 and the body sensors unit 38 are combined at block 32 and supplied to an autopilot 34.

The autopilot 34 converts the commanded input into fin commands for actuators of the control surface represented by block 40, based on airframe aerodynamic characteristics and sensed missile body angular rates and linear acceleration. The resulting motion produces new missile dynamics in unit 36, which closes the three feedback loops.

Two optimal guidance laws have been developed which are based on the nonlinear spherical-based target motion model (ref. [5]) and which do not require an estimate of $t_{go}$. The problem of solving a nonlinear optimization problem in real time is avoided by creating a family of linear models where each member closely approximates the nonlinear kinematics model over a specific small portion of the trajectory. A family of linear-quadratic optimal control problems is then posed whose solution represents a family of guidance laws. Each member of this guidance law family represents an optimal guidance strategy over the corresponding small segment of the trajectory. In this way, the guidance laws are matched to the nonlinear kinematics model (ref. [5]) and the appropriate guidance law for each portion of the trajectory is then adaptively selected based on the estimates from the target state filter. The guidance concept is referred to as adaptive matched augmented PROVAV and the two (families of) guidance laws are referred to as adaptive matched augmented angular PRONAV (AMAAP) and adaptive matched augmented linear PRONAV (AMALP). In contrast to traditional PRONAV, which attempts to minimize miss distance, these guidance laws minimize deviations from the collision triangle over the entire homing flight of the guided weapon. By using this strategy, AMAAP and AMALP indirectly minimize miss distance and do not require an estimate of $t_{go}$.

Nonlinear Spherical Target Motion Model

The spherical target state motion model developed in [5] was derived in the LOS frame using Newton's Second Law. The LOS frame is a rotating frame described by the three unit vectors $\{e_r, e_{AZ}, e_{EL}\}$ (see FIG. 1).

The vector e, is aligned with the LOS vector; the vector $e_{AZ}$ is obtained from the cross product of the LOS vector and its projection onto the $X_M$–$Y_M$ plane; and the vector $e_{EL}$ is obtained from the cross product of $e_r$ and $e_{AZ}$. The subscripts r, AZ, and EL refer to the range, azimuth, and elevation, respectively. All quantities in the model come from inertial vectors which have been instantaneously resolved in the LOS frame. The model contains the following azimuth rate and elevation rate equations describing the angular kinematics of the LOS vector:

$$\dot{\alpha} = \frac{\dot{\sigma}_{AZ}}{\cos\delta} \tag{4}$$

$$\ddot{\sigma}_{AZ} = \frac{a_{T_{AZ}} - a_{M_{AZ}}}{r} + \frac{2V_C\dot{\sigma}_{AZ}}{r} - \dot{\sigma}_{AZ}\dot{\sigma}_{EL}\tan\delta \tag{5}$$

$$\dot{\delta} = -\dot{\sigma}_{EL} \tag{6}$$

$$\ddot{\sigma}_{EL} = -\frac{a_{T_{EL}} - a_{M_{EL}}}{r} + \frac{2V_C\dot{\sigma}_{EL}}{r} + \dot{\sigma}_{AZ}^2\tan\delta \tag{7}$$

Expanding Eqs. (5) and (7) in terms of the missile flight path angle rates $\dot{\chi}$ and, $\dot{\gamma}$ yields.

$$\ddot{\sigma}_{AZ} = \frac{1}{r}a_{T_{AZ}} - \frac{1}{r}\left[V_{M_r}\begin{matrix}+\dot{V}_{M_{AZ}}\\ \dot{\chi}\end{matrix}\right] + \frac{V_{M_r}}{r}\left[\frac{2V_c}{V_{M_r}}\right]\dot{\sigma}_{AZ} + \dot{\sigma}_{AZ}\dot{\sigma}_{EL}\tan\sigma_{EL} \tag{8}$$

-continued $$\ddot{\sigma}_{EL} = -\frac{1}{r}a_{T_{EL}} + \frac{1}{r}\left[V_{M_r}(-\dot{\gamma}) + \dot{V}_{M_{EL}}\right] + \frac{V_{M_r}}{r}\left[\frac{2V_c}{V_{M_r}}\right]\dot{\sigma}_{EL} - \dot{\sigma}_{AZ}^2\tan\sigma_{EL} \tag{9}$$

Here, $\dot{\chi}$ and $\dot{\gamma}$ are inertial flight path angle rates expressed in the LOS frame.

Family of Time-Invariant Linear Models

Defining the following state space variables for the elevation and azimuth channels, respectively,

| AZIMUTH | ELEVATION |
|---|---|
| $x_1 = \sigma_{AZ}$ | $x_1 = \sigma_{EL}$ |
| $x_2 = \dot{\sigma}_{AZ}$ | $x_2 = \dot{\sigma}_{EL}$ |
| $x_3 = \dot{V}_{M_{AZ}}$ | $x_3 = a_{T_{EL}}$ |
| $x_4 = \dot{V}_{M_{AZ}}$ | $x_4 = \dot{V}_{M_{EL}}$ |
| $u = \dot{\chi}$ | $u = \gamma$ |

(10)

leads to the linear time-invariant equations for the kinematics of $\chi_2 = \dot{\sigma}_{AZ}$ and $\chi_2 = \dot{\sigma}_{EL}$, respectively.

AZIMUTH $$\dot{\chi}_2 = c_1K_1\chi_2 + c_2\chi_3 - c_2\chi_4 - c_1\dot{\chi} \tag{11}$$

ELEVATION $$\dot{\chi}_2 = c_1K_1\chi_2 - c_2\chi_3 + c_2\chi_4 - c_1\dot{\gamma} \tag{12}$$

where the parameters $$c_1 = \frac{V_{M_r}}{r} \qquad c_2 = \frac{1}{r} \qquad K_1 = \frac{2V_c}{V_{M_r}} \tag{13}$$

are assumed to be constant over some small time span. Note that the last term in each of the equations (8) and (9) has been dropped. These terms represent nonlinear effects which couple the two equations. Since they represent second order effects, these terms will be ignored.

The models (11) and (12) represent a family of models parameterized by the coefficients $c_1$, $c_2$, and $K_1$. I. Estimates of these coefficients can be obtained from the spherical target state estimator [5]. A given set of parameters yields a linear kinematics model which closely approximates the nonlinear model over a small segment of the trajectory.

Adaptive Matched Augmented Angular PRONAV (AMAAP)

A parameterized family of guidance laws based on the linear time-invariant models (11) and (12) will now be developed for both the azimuth and elevation guidance channels. Consider the following infinite-horizon linear-quadratic control problems:

AZIMUTH CHANNEL

Minimize the performance index $$J_{AZ} = \int_0^\infty \left(x_2 - \frac{u}{K_2}\right)^2 dt \tag{14}$$

subject to the linear constraints $$\dot{\chi}_1 = \chi_2 \tag{15}$$

$$\dot{\chi}_2 = c_1K_1\chi_2 + c_2\chi_3 - c_2\chi_4 - c_1u \tag{16}$$

$$\dot{\chi}_3=-\lambda\chi_3 \tag{17}$$

$$\dot{\chi}_4=0 \tag{18}$$

ELEVATION CHANNEL

Minimize the performance index $$J_{EL}=\int_0^\infty\left(x_2-\frac{u}{K_2}\right)^2 dt \tag{19}$$

subject to the linear constraints $$\dot{\chi}_1=\chi_2 \tag{20}$$

$$\dot{\chi}_2=c_1K_1\chi_2-c_2\chi_3+c_2\chi_4-c_1u \tag{21}$$

$$\dot{\chi}_3=-\lambda\chi_3 \tag{22}$$

$$\dot{\chi}_4=0 \tag{23}$$

In the above, the target acceleration $\chi_3$ is modelled as a first-order process, as it is in the spherical-based target motion modes [5], while the missile deceleration (slowdown) $\chi_4$ is modelled as a constant. The latter modelling assumption is not restrictive since it only requires that the actual missile slowdown be approximately piecewise constant, where the constant intervals are of small duration.

The quadratic performance indices (14) and (19) can be viewed as minimizing deviations from the collision triangle. Indeed, for those time intervals where the integrand is zero, the flight path angle rate is proportional to the LOS rate, which is the basic proportional navigation algorithm for establishing a collision course. In a constant velocity scenario, the value of the performance indices would be zero. When the target is accelerating and the missile is slowing down, the controls are unable to zero out the integrands due to the constraint equations (15)–(18) and (20)–(23).

Therefore, we would like to minimize the deviations from the collision triangle over the entire intercept encounter, while simultaneously limiting the control activity via the control penalty weight $K_2$. At some point between $t_0$ and $t_\infty$, intercept or detonation will occur. However, we do not need to know the time of that event, since prior to that event we are constantly re-establishing the collision triangle. This strategy indirectly results in the achievement of minimum miss distance and avoids the need to estimate $t_{go}$.

Problems (14)–(18) and (19)–(23) are linear-quadratic regulator problems of the form:

Minimize the performance index $$J=\int_0^\infty x^TQx+2x^TSu+u^TRu\,dt \tag{24}$$

subject to the linear constraints $$\dot{\chi}=A\chi+Bu \tag{25}$$

Provided that $Q-SR^{-1}S^T$ is at least positive semidefinite, it is well-known [7] that the solution of such a problem is given by $$u^*=-R^{-1}[B^TP+S^T]\chi \tag{26}$$

where P is the solution of the algebraic Riccati equation $$[A-BR^{-1}\ {}^{d\,ST}]^TP+P[A-BR^{-1}S^T]-PBR^{-1}B^TP+Q-SR^{-1}S^T=0 \tag{27}$$

The solutions of problems (14)–(18) and (19)–(23) have been analytically obtained by solving the associated Riccati equations. The following solutions represent the AMAAP guidance law in each channel:

$$\dot{\chi}=(2K_1-K_2)\dot{\sigma}_{AZ}+\left[\frac{2c_2(K_1-K_2)}{\lambda+c_1(K_1-K_2)}\right]a_{T_{AZ}}-\left[\frac{2c_2}{c_1}\right]\dot{V}_{M_{AZ}} \tag{28}$$

$$\dot{\gamma}=(2K_1-K_2)\dot{\sigma}_{EL}-\left[\frac{2c_2(K_1-K_2)}{\lambda+c_1(K_1-K_2)}\right]a_{T_{EL}}+\left[\frac{2c_2}{c_1}\right]\dot{V}_{M_{EL}} \tag{29}$$

Selecting the weight $K_2$ on the control to be $$K_2=\frac{K_1}{2}$$

yields $$\dot{\chi}=\frac{3V_c}{V_{M_r}}\dot{\sigma}_{AZ}+\left[\frac{c_2K_1}{\lambda+\frac{1}{2}c_1K_1}\right]a_{T_{AZ}}-\left[\frac{2c_2}{c_1}\right]\dot{V}_{M_{AZ}} \tag{30}$$

$$\dot{\gamma}=\frac{3V_c}{V_{M_r}}\dot{\sigma}_{EL}-\left[\frac{c_2K_1}{\lambda+\frac{1}{2}c_1K_1}\right]a_{T_{EL}}+\left[\frac{2c_2}{c_1}\right]\dot{V}_{M_{EL}} \tag{31}$$

Equations (30) and (31) represent the matched augmented angular PRONAV algorithm with an effective navigation ratio of N=3. Note that the missile's deceleration has been optimally accounted for in the form of the third term in each equation.

From the nonlinear target state estimator and the onboard inertial navigation system, estimates of the parameters are readily available, i.e., $$\hat{c}_1=\frac{\hat{V}_{M_r}}{\hat{r}}\qquad \hat{c}_2=\frac{1}{\hat{r}}\qquad \hat{K}_1=\frac{2\hat{V}_c}{\hat{V}_{M_r}} \tag{32}$$

as well as estimates of the target's acceleration $\alpha_{T_{AZ}}$ and $\alpha_{T_{EL}}$ and the missile's deceleration $\dot{V}_{M_{AZ}}$ and $\dot{V}_{M_{EL}}$.

Thus, the guidance law that matches the intercept kinematics over a specific small segment of the intercept trajectory can be adaptively selected. Moreover, the selected guidance law is an optimal guidance law over that segment of the trajectory since it is the solution of a linear-quadratic control problem. The adaptation can be carried out at the rate of the autopilot's outer loop. Each time a new guidance law is selected, the new set of parameters causes a slight jump in the commanded flight path angle rate which, in turn, produces a jump in the autopilot's commanded body rates. Adapting at the rate of the outer loop eliminates such jumps from taking place in the autopilot's inner loop.

Adaptive matched augmented angular PRONAV achieves a significant level of system integration between the guidance law and the target state estimator. Furthermore, since an autopilot is basically an angular controller, a high degree of system integration can be achieved between the angular guidance law and the autopilot through the development of angular-based autopilot command logic.

Adaptive Matched Augmented Linear PRONAV (AMALP)

Equations (28) and (29) can be converted to command linear acceleration by multiplying both sides of the equations by $V_{M_r}$. The elevation equation must additionally be multiplied by −1 since, in the way that the LOS frame has been defined, a positive $\dot{\gamma}$ produces a negative $\phi_{M_{El}}$. Doing so yields the general forms $$a_{M_{AZ}} = V_{M_r}(2K_1 - K_2)\dot{\sigma}_{AZ} + \left[\frac{2c_1(K_1 - K_2)}{\lambda + c_1(K_1 - K_2)}\right]a_{T_{AZ}} - 2\dot{V}_{M_{AZ}} \tag{33}$$

$$a_{M_{EL}} = -V_{M_r}(2K_1 - K_2)\dot{\sigma}_{EL} + \left[\frac{2c_1(K_1 - K_2)}{\lambda + c_1(K_1 - K_2)}\right]a_{T_{EL}} - 2\dot{V}_{M_{EL}} \tag{34}$$

Choosing $$K_2 = \frac{K_1}{2}$$

yields the specific forms $$a_{M_{AZ}} = 3V_c\dot{\sigma}_{AZ} + \left[\frac{c_1K_1}{\lambda + \frac{1}{2}c_1K_1}\right]a_{T_{AZ}} - 2\dot{V}_{M_{AZ}} \tag{35}$$

$$a_{M_{EL}} = -3V_c\dot{\sigma}_{EL} + \left[\frac{c_1K_1}{\lambda + \frac{1}{2}c_1K_1}\right]a_{T_{EL}} - 2\dot{V}_{M_{EL}} \tag{36}$$

The AMALP guidance law in conjunction with the spherical target state estimator [5] has been evaluated in the Advanced Medium Range Air-to-Air Missile (AMRAAM) Simple Seeker 6-dof Simulation [8]. The performance of this guidance law/target state estimator pair was outstanding. The Monte Carlo results of this evaluation are presented in [9].

It is understood that certain modifications to the invention as described may be made, as might occur to one with skill in the field of the invention, within the scope of the appended claims. Therefore, all embodiments contemplated hereunder which achieve the objects of the present invention have not been shown in complete detail. Other embodiments may be developed without departing from the scope of the appended claims.

What is claimed is:

1. A guided missile system using Adaptive Matched Augmented Proportional Navigation, wherein a guidance law algorithm directs tactical weapons to intercept against targets;

using a family of linear models comprising a number of members, where each member closely approximates a nonlinear kinematics model over a specific small segment of a trajectory, means providing solutions for a family of linear-quadratic optimal control problems which represents a family of guidance laws, wherein each member of this guidance law family represents an optimal guidance strategy over the corresponding small segment of the trajectory, so that the guidance laws are matched to a nonlinear kinematics model, and means in which an appropriate guidance law for each portion of the trajectory is then adaptively selected based on the estimates from a target state filter.

whereby the guidance law is an optimal guidance law in that it is a solution of a family of linear-quadratic regulator control problems and minimizes deviations from establishment of a collision course over the entire period of homing flights thereby indirectly minimizing miss distance.

2. The guided missile system using Adaptive Matched Augmented Proportional Navigation according to claim 1 wherein the guidance law algorithm includes means for commanding flight path angle rate.

3. The guided missile system using Adaptive Matched Augmented Proportional Navigation according to claim 1 wherein the guidance law algorithm includes means for commanding linear acceleration.

* * * * *